United States Patent
Kaga

(10) Patent No.: US 6,851,806 B2
(45) Date of Patent: Feb. 8, 2005

(54) PROGRESSIVE MULTIFOCAL LENS AND METHOD OF DESIGNING THE SAME

(75) Inventor: Tadashi Kaga, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/665,393

(22) Filed: Sep. 22, 2003

(65) Prior Publication Data

US 2004/0150791 A1 Aug. 5, 2004

(30) Foreign Application Priority Data

Sep. 20, 2002 (JP) ........................................ 2002-275179

(51) Int. Cl.⁷ ................................................ G02C 7/06
(52) U.S. Cl. ...................................... 351/169; 351/177
(58) Field of Search ................................ 351/159, 168, 351/169, 177

(56) References Cited

U.S. PATENT DOCUMENTS 5,479,220 A * 12/1995 Komatsu et al. ............ 351/159
6,019,470 A    2/2000 Mukaiyama et al.

FOREIGN PATENT DOCUMENTS

| DE | 100 59 023 A1 | 6/2002 |
| DE | 101 03 113 A1 | 8/2002 |
| EP | 0 809 126 A1 | 11/1997 |
| EP | 1 004 918 A1 | 5/2000 |
| JP | 2002-372689 A | 12/2002 |
| WO | WO 97/19382 A1 | 5/1997 |

* cited by examiner

Primary Examiner—Georgia Epps
Assistant Examiner—Darryl J. Collins
(74) Attorney, Agent, or Firm—Sughrue Mion, PLLC

(57) ABSTRACT

To offer a novel combining formula for combining a progressive refractive surface and a toric surface, thereby to provide a novel progressive multifocal lens which has an eyesight correcting capability and an astigma remedying capability on an identical refractive surface. Using a combining formula indicated by a combining formula (1) or (2), a refractive surface 2 on an eyeball side or a refractive surface 3 on an object side is made a combined refractive surface 14+15 in which an original progressive refractive surface 14 set only for the purpose of demonstrating a desired eyesight-correcting characteristic, and an original toric surface 15 set only for the purpose of demonstrating a desired astigma-remedying characteristic are combined.

24 Claims, 7 Drawing Sheets

ASTIGMATISM DIAGRAM OF CONVENTIONAL LENS HAVING PROGRESSIVE SURFACE ON OUTER SURFACE AND TORIC SURFACE ON INNER SURFACE

ASTIGMATISM DIAGRAM OF EXAMPLE 1

ASTIGMATISM DIAGRAM OF CONVENTIONAL LENS HAVING PROGRESSIVE SURFACE ON OUTER SURFACE AND TORIC SURFACE ON INNER SURFACE

ASTIGMATISM DIAGRAM OF EXAMPLE 2

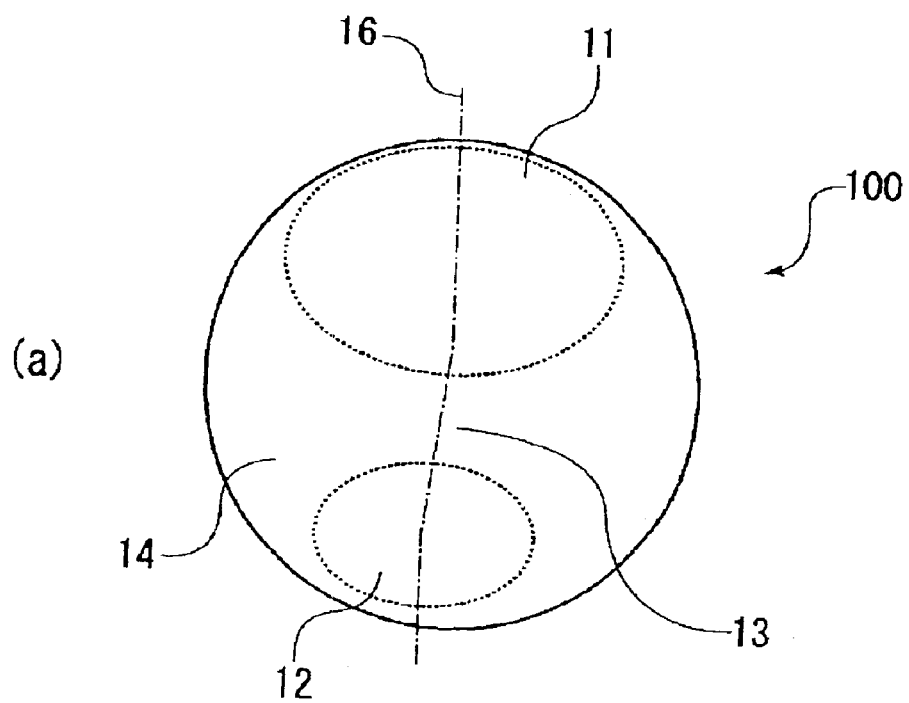
FIG. 7A
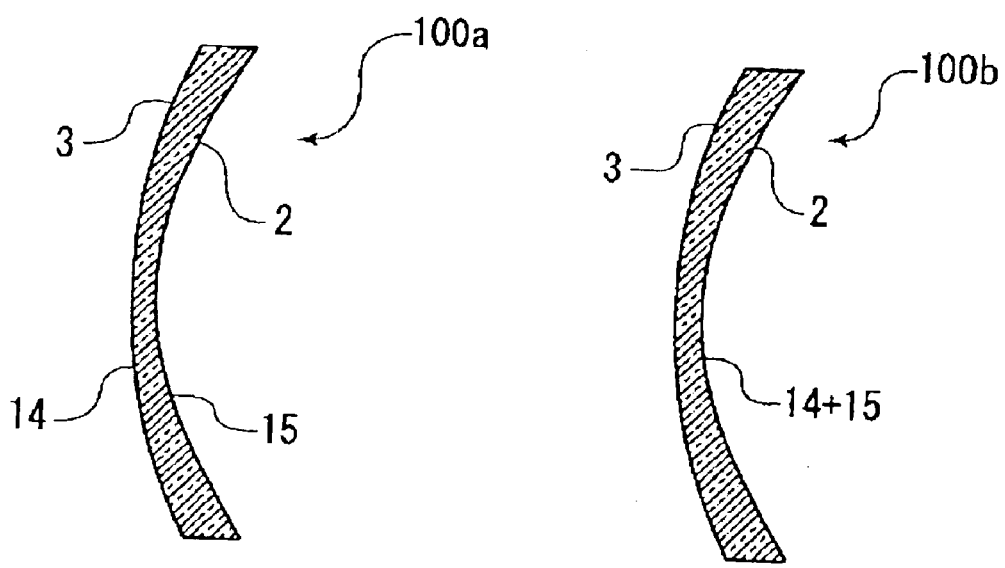
FIG. 7B
FIG. 7C

PROGRESSIVE MULTIFOCAL LENS AND METHOD OF DESIGNING THE SAME

BACKGROUND

This disclosure teaches a progressive multifocal lens having an eyesight correcting capability and an astigmatism remedying capability, and a method of designing such a multifocal lens.

RELATED ART

A progressive multifocal lens is a lens having two visual field portions of different refractive powers, and a visual field portion whose refractive power changes progressively between the two visual field portions. Such a multifocal lens has no boundaries between the visual field portions. In addition to attaining visual fields with different powers with the single lens, such a multifocal lens is aesthetically more appealing. Therefore, it is often employed as a lens for spectacles that are used to correct various vision defects, like, for example, presbyopia.

FIG. 7(a) shows the general structure of a conventional progressive multifocal lens which is often used as a lens for spectacles. In the progressive multifocal lens 100 a far-use portion 11, located above, helps in seeing things located at a distance. A near-use portion 12, that has a refractive-power different from 11, is located below that helps in seeing things located nearby. A progressive portion 13 provides a smooth transition between the far-use portion 11 and the near-use portion 12 are held in smooth communication by a progressive portion 13. The progressive portion 13 has a refractive power that changes continuously in order to see a thing at the intermediate distance between the far distance and the near distance.

For a single-plate lens to be used as a lens in spectacles, the two refractive surfaces (namely, a refractive surface 2 on the side of an eyeball and a refractive surface 3 on the side of an object to be seen as shown in FIG. 7(b)) are required provide various functionalities required from a spectacle lens. For example, a vertex refractive power need to conform to the diopters of a user. Likewise, a cylindrical refractive power need to be provided for remedying astigmatism. Further, an additional refractive power is required for compensating presbyopia. Still further, a prismatic refractive power is required for remedying heterophoria.

As shown in FIG. 7(b), in the conventional progressive multifocal lens 100a, a progressive refractive surface 14 provides a continuously changing refractive power to provide for the far-use portion 11, the near-use portion 12 and the progressive portion 13 that is formed on the refractive surface 3 on the object side. On the other hand, the refractive surface 2 on the eyeball side is used as an astigmia-remedying toric surface 15.

In contrast to the conventional progressive multifocal lens 100a, the Applicant has developed a "inner-surface progressive multifocal lens" 100b wherein a progressive refractive surface is formed on the refractive surface 2 on the eyeball side. This takes into account the arrangement of the progressive refractive surface which gives the magnifying power of the progressive multifocal lens while at the same time lessens shaking and distortion of an image attributed to fluctuations in the magnifying powers of the far-use portion 11 and near-use portion 12 of the progressive multifocal lens. The structure of the multi-focal lens 100bs is described in WO 97/19382.

The inner-surface progressive multifocal lens 100b disclosed in WO 97/19382 can reduce the difference between magnifying powers in a far-use portion and a near-use portion, thereby sharply reducing the shaking and distortion of an image attributed to the difference.

In such an inner-surface progressive multifocal lens 100b, the progressive refractive surface 14 is located on the eyeball-side refractive surface 2. The astigmia-remedying toric surface 15 is combined on the eyeball-side refractive surface 2. The progressive multifocal lens 100b, in which the eyeball-side refractive surface 2 includes both an eyesight correcting property and an astigmia remedying property, can suppress the difference of the magnifying powers of the far-use portion and near-use portion to the required minimum. Therefore, the distortion and shaking of an image is reduced while providing adequate astigmia correction.

The progressive multifocal lens 100b which includes both the eyesight correcting property and the astigmia remedying property on the eyeball-side refractive surface 2, can be designed using the following steps. In the first step, a progressive refractive surface (hereinafter, "original progressive refractive surface") that only has an eyeball-side refractive surface to provide a desired eyesight-correcting characteristic is calculated. In the second step, a toric surface (hereinafter, "original toric surface") that only has an eyeball-side refractive surface to provide a desired astigmia-remedying characteristic is calculated. In the third step, the eyeball-side refractive surface of the progressive multifocal lens is calculated from the original progressive refractive surface and the original toric surface.

The above document WO 97/19382 provides a combining formula for integrating the original progressive refractive surface and the original toric surface.

In the progressive multifocal lens 100b, it is recognized that, as in the conventional progressive multifocal lens 100a, an eyesight correcting capability intended to remedy astigmia is not hampered over substantially the whole region of a principal fixation line 16, and that astigmatism can be corrected in a stable manner.

Problems with Conventional Technology

A "toric surface" is defined as a surface whose radii of curvature in sections orthogonal to each other are different so as to have the maximum refractive power within a certain meridian plane and the minimum refractive power within a meridian plane rectangular to the certain meridian plane. However, the respective sectional shapes of the meridian plane affording the maximum refractive power and the meridian plane affording the minimum refractive power are circular arcs. The shape of the curved plane between both the meridian planes is not especially determined. That is, it can be said that the planar shape of the toric surface exist infinitely.

The combining formula proposed in the document WO 97/19382 has the advantage that the computation is comparatively easy. However, it merely combines the original surfaces by regarding the shape of the toric surface as being constant in the radius of curvature in an x-axial direction and the radius of curvature in a y-axial direction, respectively.

Accordingly, the combined refractive surface of the progressive refractive surface and toric surface that provides an improved astigmia correction can be provided by offering another combining formula that uses a planar shape of the toric surface.

SUMMARY

To realize some of the advantages noted above there is provided a progressive multifocal lens for correcting an eyesight, said lens having a progressive refractive surface on an eyeball side (or an object side), said progressive refractive surface comprising a far-use portion, a near-use portion having a refractive power different from the far-use portion, and a progressive portion whose refractive power changes progressively between the far-use and near-use portions, wherein the progressive refractive surface is a combination of an original progressive refractive surface for remedying only eyesight and a an original toric surface for remedying only astigmia based on either of the following formulae:

$$z_p = \frac{(c_p+c_x)\left(\frac{(c_p+c_y)y_p^2}{1+\sqrt{1-(c_p+c_y)^2 y_p^2}}\right) - }{1+\sqrt{\left(1-\frac{(c_p+c_x)(c_p+c_y)y_p^2}{1+\sqrt{1-(c_p+c_y)^2 y_p^2}}\right)^2 - (c_p+c_x)^2 x_p^2}} \quad (1)$$

$$z_p = \frac{(c_p+c_y)\left(\frac{(c_p+c_x)x_p^2}{1+\sqrt{1-(c_p+c_x)^2 x_p^2}}\right) - }{1+\sqrt{\left(1-\frac{(c_p+c_x)(c_p+c_y)x_p^2}{1+\sqrt{1-(c_p+c_x)^2 x_p^2}}\right)^2 - (c_p+c_y)^2 y_p^2}} \quad (2)$$

where z-axis is an axis which passes through a center of the progressive refractive surface from an object side onto the eyeball side, x-axis is in a direction of an cylinder axis of the original toric surface, and y-axis is an axis which is orthogonal to the z-axis and the x-axis, $z_p$ is any point $P(x_p, y_p, z_p)$ of the combined refractive surface, $C_p$ is an approximate curvature of the original progressive refractive surface, $C_x$ is a curvature in the direction of the cylinder axis of said original toric surface, and $C_y$ is a curvature in a direction orthogonal to said cylinder axis.

In a further enhancement, a progressive multifocal lens characterized in that the refractive surface on the eyeball side or the refractive surface on the object side, opposite to the surface on which the combined refractive surface is located, is a spherical surface or a rotationally-symmetric nonspherical surface.

Another aspect of the disclosed teachings is a method of designing a multifocal lens for correcting an eyesight, said lens having a progressive refractive surface on an eyeball side, said progressive refractive surface comprising a far-use portion, a near-use portion having a refractive power different from the far-use portion, and a progressive portion whose refractive power changes progressively between the far-use and near-use portions, the method comprising calculating an original progressive refractive surface for remedying only eyesight, calculating an original toric surface for remedying only astigmia based and calculating a combined refractive surface using above formulae (1) or (2).

BRIEF DESCRIPTION OF THE DRAWINGS

The disclosed teachings will become more apparent by describing in detail examples and embodiments thereof with reference to the attached drawings in which:

FIG. 7 shows the schematic constructions of conventional progressive multifocal lenses, wherein (a) shows a front view, (b) a sectional view of an example in which a progressive refractive surface is afforded on the refractive surface of an object side, and (c) a sectional view of an example in which a progressive refractive surface is afforded on the refractive surface of an eyeball side.

DETAILED DESCRIPTION

Illustrative embodiments of the disclosed progressive multifocal lens and a technique for designing it are described herein. However, the present invention is defined by the claims and shall not be restricted to the ensuing embodiments.

The disclosed progressive multifocal lens has a progressive refractive surface including a far-use portion and a near-use portion which have different refractive powers. It further has a progressive portion whose refractive power changes progressively between the far-use and near-use portions. The progressive refractive surfaces can all be on a refractive surface on the side of the eyeball of the person wearing the eyeglass with the lens. Alternately, progressive refractive surfaces can all be on a refractive surface on the side of an object that person wearing the eyeglass with the lens is viewing.

Figure 1A:
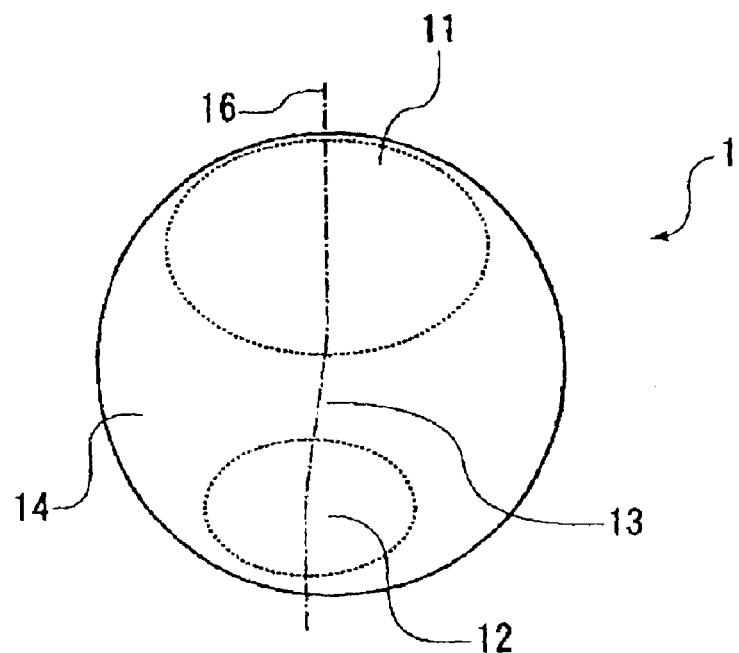
FIG. 1 shows the schematic constructions of the progressive multifocal lenses of the present invention, wherein (a) shows a front view, (b) a sectional view of an example in which a combined refractive surface is afforded on the refractive surface of an object side, and (c) a sectional view of an example in which a combined refractive surface is afforded on the refractive surface of an eyeball side.
Figures 1B, 1C:
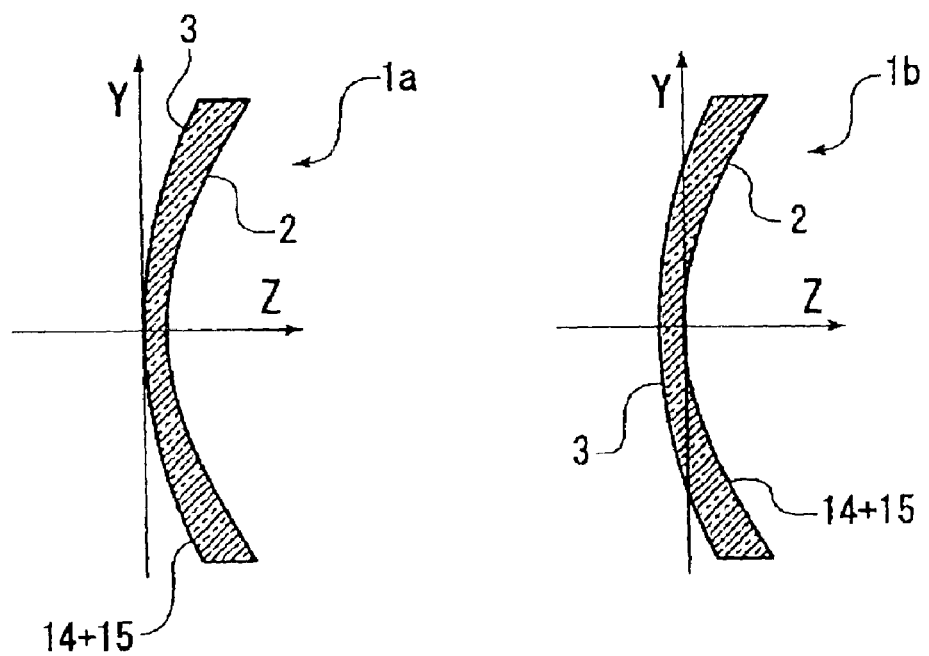

FIG. 1, shows an example of a progressive multifocal lens 1 embodying the disclosed teachings. A far-use portion 11 which is a visual field portion for seeing a thing at a far distance is located above. A near-use portion 12 is located below that has a visual field portion which has a refractive power different from that of the far-use portion to see things at a near distance. The far-use portion 11 and the near-use portion 12 transition smoothly across a progressive portion 13 being a visual field portion which has a refractive power that changes continuously. The progressive portion 13 is used to see things at the intermediate distance between the far distance and the near distance.

In a specific embodiment an outer-surface progressive multifocal lens 1a has a progressive refractive surface 14 including the far-use portion 11, near-use portion 12 and progressive portion 13 that is located on an object-side refractive surface 3 (also termed "convex surface" or "outer surface") as shown in FIG. 1(*b*).

In an alternate embodiment, the lens may be fabricated as an inner-surface progressive multifocal lens 1*b* in which the progressive refractive surface 14 is located on an eyeball-side refractive surface 2 (also termed "concave surface" or "inner surface") as shown in FIG. 1(*c*).

As compared with the progressive multifocal lens 1*a* which has the progressive refractive surface 14 on the outer surface, the inner-surface progressive multifocal lens 1*b* can reduce the difference between magnifying powers in the far-use portion 11 and the near-use portion 12 and can sharply relieve the shaking and distortion of an image attributed to the difference.

When the curvature of the progressive refractive surface is provided at the eyeball-side refractive surface 2, the curvature (the inverse number of the radius of curvature) of the progressive refractive surface along a principal fixation line 16 becomes smaller in the near-use portion 12 than in the far-use portion 11. Besides, in the far-use portion 11, the curvature of the progressive refractive surface reduces along a distance from the principal fixation line 16 in, at least, a partial region. On the other hand, in the near-use portion 11, the curvature of the progressive refractive surface increases along a distance from the principal fixation line 16 in, at least, a partial region.

Further, it is desirable that on that on the progressive refractive surface, astigmatism involved in constructing the progressive refractive surface is minimized on the principal fixation line 16. For this purpose, the curvature of the progressive refractive surface should desirably equalize curvatures in two orthogonal directions, at least, in a partial region of the principal fixation line 16.

In the progressive multifocal lens 1 that embodies the disclosed teachings, either refractive surface of the object-side refractive surface 3 or the eyeball-side refractive surface 2 is constructed as a combined refractive surface 14+15. Such a combined refractive surface has both an eyesight correcting capability and an astigmia remedying capability.

In case of the outer-surface progressive multifocal lens 1*a* shown in FIG. 1(*b*), the combined refractive surface 14+15 is located on the object-side refractive surface 3 and the eyeball-side refractive surface 2 on the opposite side is made of spherical surfaces or rotationally-symmetric non-spherical surfaces.

In case of the inner-surface progressive multifocal lens 1*b* shown in FIG. 1(*c*), the combined refractive surface 14+15 is located on the eyeball-side refractive surface 2 and the object-side refractive surface 3 on the opposite side is made of spherical surfaces or rotationally-symmetric nonspherical surfaces.

When the combined refractive surface 14+15 is located on the eyeball-side refractive surface 2, astigmia can be remedied, and the difference between the magnifying powers of the far-use portion 11 and the near-use portion 12 can be suppressed to the required minimum, as stated above. Since there is little distortion and shaking of the image, a viewer, including a viewer with astigmia, can experience a more pleasant viewing.

In designing such a progressive multifocal lens in which either of the refractive surfaces has both the eyesight correcting capability and the astigmia remedying capability a first step involved calculating a progressive refractive surface (hereinafter, "original progressive refractive surface") that serves the only the purpose of correcting an eyesight. In other words, the calculation is performed without taking into account the required astigmia correction. In the second step a toric surface (hereinafter, "original toric surface") is calculated. The calculated toric surface is meant to serve only the purpose of causing the eyeball-side refractive surface 2 or the object-side refractive surface 3 to remedy astigmia (without considering other eyesight correction requirements). In the third step a combined refractive surface is calculated from the original progressive refractive surface and the original toric surface by using a combining formula.

In the first step, the original progressive refractive surface is calculated based on parameters representing the degree of presbyopia (for example) of a user and circumstances such as the way in which the spectacles are used. The result is stored as coordinates, radius of curvature, etc.

At the second step, a curved surface representing a toroidal surface 15 is calculated. The "toroidal surface" signifies the refractive surface of the locus of a circular arc in the case where the circular arc having a comparatively large radius of curvature is rotated about a center axis being a straight line which exists on the side of the center of the circular arc at a predetermined distance and which is parallel to a tangential line to the circular arc.

In the third step, the combined refractive surface in which the original progressive refractive surface and the original toric surface are combined is calculated by the following combining formula (1) or combining formula (2):

Equation 5

$$z_p = \frac{2\left(\frac{(c_p+c_y)y_p^2}{1+\sqrt{1-(c_p+c_y)^2 y_p^2}}\right) - (c_p+c_x)\left(\frac{(c_p+c_y)y_p^2}{1+\sqrt{1-(c_p+c_y)^2 y_p^2}}\right)^2 + (c_p+c_x)x_p^2}{1+\sqrt{\left(1-\frac{(c_p+c_x)(c_p+c_y)y_p^2}{1+\sqrt{1-(c_p+c_y)^2 y_p^2}}\right)^2 - (c_p+c_x)^2 x_p^2}}\quad(1)$$

$$z_p = \frac{2\left(\frac{(c_p+c_x)x_p^2}{1+\sqrt{1-(c_p+c_x)^2 x_p^2}}\right) - (c_p+c_y)\left(\frac{(c_p+c_x)x_p^2}{1+\sqrt{1-(c_p+c_x)^2 x_p^2}}\right)^2 + (c_p+c_y)y_p^2}{1+\sqrt{\left(1-\frac{(c_p+c_x)(c_p+c_y)x_p^2}{1+\sqrt{1-(c_p+c_x)^2 x_p^2}}\right)^2 - (c_p+c_y)^2 y_p^2}}\quad(2)$$

Here, as shown in FIGS. 1(*b*) and (*c*), z-axis is an axis which passes through the center of the progressive refractive surface from the object side onto the eyeball side in a spectacle-mounted state. The x-axis is in the direction of the cylinder axis of the original toric surface. The y-axis is an axis which is orthogonal to the z-axis and the x-axis (in FIGS. 1(*b*) and (*c*) (the z-axis and the y-axis are shown). The $x_p$ and $y_p$ indicate the respective x-axial and y-axial coordinates of any point P on the refractive surface of the object side or eyeball side. While, $z_p$ indicates the z-axial coordinate thereof in the direction perpendicular to the refractive surface of the object side or eyeball side. A point at which the object-side refractive surface 3 and the z-axis intersect is set as the origin for this object-side refractive surface 3, while a point at which the eyeball-side refractive surface 2 and the z-axis intersect is set as the original for this eyeball-side refractive surface 2.

A curvature $C_p$ is an approximate curvature at any point $P(x_p, y_p, z_p)$ on the original progressive refractive surface. A curvature $C_x$ is a curvature in the direction of the cylinder axis of the astigmia-remedying toric surface. A curvature $C_y$ is a curvature in the direction orthogonal to the cylinder axis. An average curvature in a radial direction, for example, can be adopted as the approximate curvature $C_p$, and it is allowed to use the inverse number of the radius of a circle which passes through the three points of the point P, a point $P'(-x_p, -y_p, -z_p)$ in rotational symmetry to the point P, and the inner-side vertex (0, 0, 0) or an outer-side vertex (0, 0, 0) within an xy-plane including any point $P(x_p, y_p, z_p)$ on the original progressive refractive surface and being perpendicular to the z-axis (passing through the lens center or an inner-side vertex (0, 0, 0)).

Figure 2:
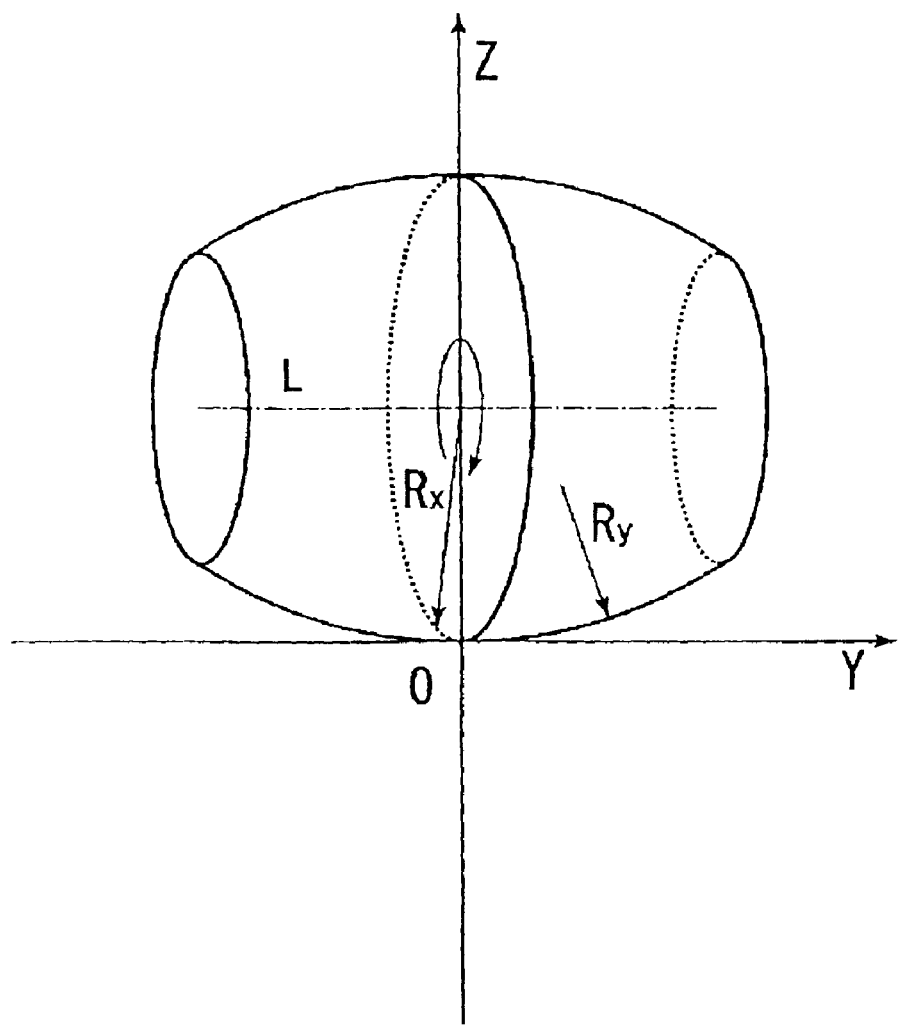
FIG. 2 is a conceptual diagram for explaining toroidal surfaces.

The computation of the combining formula (1) and (2) will be described with reference to FIG. 2. First, in an xyz-space, a circular arc of curvature $R_y$ (radius of curvature $1/C_y$) lying in contact with the y-axis at the origin as shown in FIG. 2 is considered on a yz-plane. In FIG. 2, the x-axis is in the direction perpendicular to the sheet of the drawing. The equation of the circular arc is expressed by:

Equation 6

$$z_y = \frac{c_y y^2}{1 + \sqrt{1 - c_y^2 y^2}} \quad (3)$$

As shown in FIG. 2, consider a toroidal surface which is formed by rotating the circular arc about an axis that is a straight line L passing through a point $(0, 0, R_x)$ and parallel to the y-axis. The z-coordinate of the toroidal surface is the same as that of a circular arc rotated about a point $(0, R_x)$ on an xz-plane, as shown in FIG. 2.

The equation of the circular arc obtained by rotating $z_y$ about the point $(0, R_x)$ on the xz-plane is:

Equation 7

$$(z - R_x)^2 + x^2 = (R_x - z_y)^2 \quad (4)$$

Solving Equation (4) with respect to z,
Equation 8

$$(z - R_x)^2 = (R_x - z_y)^2 - x^2$$

$$z - R_x = -\sqrt{(R_x - z_y)^2 - x^2}$$

$$z = R_x - \sqrt{(R_x - z_y)^2 - x^2}$$

Putting $C_x = 1/R_x$,

Equation 9

$$z = \frac{1}{c_x} - \sqrt{\left(\frac{1}{c_x} - z_y\right)^2 - x^2} = \frac{1}{c_x} - \sqrt{\left(\frac{1 - c_x z_y}{c_x}\right)^2 - x^2}$$

$$= \frac{1}{c_x} - \sqrt{\frac{(1 - c_x z_y)^2}{c_x^2} - x^2} = \frac{1}{c_x} - \sqrt{\frac{(1 - c_x z_y)^2 - c_x^2 x^2}{c_x^2}}$$

$$= \frac{1}{c_x} - \frac{\sqrt{(1 - c_x z_y)^2 - c_x^2 x^2}}{c_x} = \frac{1 - \sqrt{(1 - c_x z_y)^2 - c_x^2 x^2}}{c_x}$$

When the numerator and denominator of Equation 9 are multiplied by:

Equation 10

$$1 + \sqrt{(1 - c_x z_y)^2 - c_x^2 x^2}$$

Equation 9 becomes:

Equation 11

$$z = \frac{\left(1 - \sqrt{(1 - c_x z_y)^2 - c_x^2 x^2}\right)\left(1 + \sqrt{(1 - c_x z_y)^2 - c_x^2 x^2}\right)}{c_x\left(1 + \sqrt{(1 - c_x z_y)^2 - c_x^2 x^2}\right)}$$

$$= \frac{1 - \left(\sqrt{(1 - c_x z_y)^2 - c_x^2 x^2}\right)^2}{c_x\left(1 + \sqrt{(1 - c_x z_y)^2 - c_x^2 x^2}\right)}$$

$$= \frac{1((1 - c_x z_y)^2 - c_x^2 x^2)}{c_x\left(1 + \sqrt{(1 - c_x z_y)^2 - c_x^2 x^2}\right)}$$

$$= \frac{1 - (1 - c_x z_y)^2 + c_x^2 x^2}{c_x\left(1 + \sqrt{(1 - c_x z_y)^2 - c_x^2 x^2}\right)}$$

$$= \frac{1 - (1 - 2 c_x z_y + c_x^2 z_y^2) + c_x^2 x^2}{c_x\left(1 + \sqrt{(1 - c_x z_y)^2 - c_x^2 x^2}\right)}$$

$$= \frac{1 - 1 + 2 c_x z_y + c_x^2 z_y^2 + c_x^2 x^2}{c_x\left(1 + \sqrt{(1 - c_x z_y)^2 - c_x^2 x^2}\right)}$$

$$= \frac{2 c_x z_y - c_x^2 z_y^2 + c_x^2 x^2}{c_x\left(1 + \sqrt{(1 - c_x z_y)^2 - c_x^2 x^2}\right)}$$

$$= \frac{c_x(2 z_y - c_x z_y^2 + c_x x^2)}{c_x\left(1 + \sqrt{(1 - c_x z_y)^2 - c_x^2 x^2}\right)},$$

and

Equation 12

$$z = \frac{2 z_y - c_x z_y^2 + c_x x^2}{1 + \sqrt{(1 - c_x z_y)^2 - c_x^2 x^2}} \quad (5)$$

is obtained.

When Equation (3) is substituted into Equation (5),

Equation 13

$$z = \frac{2\left(\dfrac{c_y y^2}{1 + \sqrt{1 - c_y^2 y^2}}\right) - c_x\left(\dfrac{c_y y^2}{1 + \sqrt{1 - c_y^2 y^2}}\right)^2 + c_x x^2}{1 + \sqrt{\left(1 - \dfrac{c_x c_y y^2}{1 + \sqrt{1 - c_y^2 y^2}}\right)^2 - c_x^2 x^2}} \quad (6)$$

is obtained. This equation (6) is an equation, which represents the original toric surface. When Cp is combined with $C_x$ and $C_y$ in the equation (6), respectively, the following equation (7) is obtained:

Equation 14

$$z = \frac{(c_p+c_x)\left(\frac{(c_p+c_y)y^2}{1+\sqrt{1-(c_p+c_y)^2y^2}}\right) - 2\left(\frac{(c_p+c_y)y^2}{1+\sqrt{1-(c_p+c_y)^2y^2}}\right)^2 + (c_p+c_x)x^2}{1+\sqrt{\left(1-\frac{(c_p+c_x)(c_p+c_y)y^2}{1+\sqrt{1-(c_p+c_y)^2y^2}}\right)^2 - (c_p+c_x)^2x^2}} \quad (7)$$

Letting $(x_p, y_p, z_p)$ denote the coordinates of any point P on the combined refractive surface to-be-calculated, the combining formula (1) is obtained.

Equation 15

$$z_p = \frac{2\left(\frac{(c_p+c_y)y_p^2}{1+\sqrt{1-(c_p+c_y)^2y_p^2}}\right) - (c_p+c_x)\left(\frac{(c_p+c_y)y_p^2}{1+\sqrt{1-(c_p+c_y)^2y_p^2}}\right)^2 + (c_p+c_x)x_p^2}{1+\sqrt{\left(1-\frac{(c_p+c_x)(c_p+c_y)y_p^2}{1+\sqrt{1-(c_p+c_y)^2y_p^2}}\right)^2 - (c_p+c_x)^2x_p^2}} \quad (1)$$

Likewise, the equation of a toroidal surface which is formed in the xyz-space in such a way that a circular arc lying in contact with the x-axis at the origin on the xz-plane is rotated about an axis being a straight line which passes through the point $(0, 0, R_y)$ and which is parallel to the x-axis, becomes [Equation 16].

$$z = \frac{2\left(\frac{c_x x^2}{1+\sqrt{1-c_x^2 x^2}}\right) - c_y\left(\frac{c_x x^2}{1+\sqrt{1-c_x^2 x^2}}\right)^2 + c_y y^2}{1+\sqrt{\left(1-\frac{c_x c_y x^2}{1+\sqrt{1-c_x^2 x^2}}\right)^2 - c_y^2 y^2}} \quad (8)$$

When $C_p$ is combined with $C_x$ and $C_y$ in this equation (8) representing the original toric surface, respectively, the following equation (9) is obtained:

Equation 17

$$z = \frac{2\left(\frac{(c_p+c_x)x^2}{1+\sqrt{1-(c_p+c_x)^2x^2}}\right) - (c_p+c_y)\left(\frac{(c_p+c_x)x^2}{1+\sqrt{1-(c_p+c_x)^2x^2}}\right)^2 + (c_p+c_y)y^2}{1+\sqrt{\left(1-\frac{(c_p+c_x)(c_p+c_y)x^2}{1+\sqrt{1-(c_p+c_x)^2x^2}}\right)^2 - (c_p+c_y)^2y^2}} \quad (9)$$

Letting $(x_p, y_p, z_p)$ denote the coordinates of any point P on the combined refractive surface to-be-calculated, the combining formula (2) is obtained.

Equation 18

$$z_p = \frac{2\left(\frac{(c_p+c_x)x_p^2}{1+\sqrt{1-(c_p+c_x)^2x_p^2}}\right) - (c_p+c_y)\left(\frac{(c_p+c_x)x_p^2}{1+\sqrt{1-(c_p+c_x)^2x_p^2}}\right)^2 + (c_p+c_y)y_p^2}{1+\sqrt{\left(1-\frac{(c_p+c_x)(c_p+c_y)x_p^2}{1+\sqrt{1-(c_p+c_x)^2x_p^2}}\right)^2 - (c_p+c_y)^2y_p^2}} \quad (2)$$

By the way, in a case where the coordinate systems of the original progressive refractive surface and the original toric surface rotate the angle "ax" of the cylinder axis, the approximate curvature Cp at the following $(p_x, p_y, p_z)$ may be employed in the coordinate system of the original progressive refractive surface.

$px = \cos(ax)x_p - \sin(ax)y_p$ $py = \sin(ax)x_p + \cos(ax)y_p$ $pz = z_p$

Equation 19

While the combining formula (1) or combining formula (2) may be more complicated and require more computations as compared with the combining formula proposed in the document WO 97/19382, the toric surface expressed by the toroidal surface is a planar shape exhibiting superior astigmia-remedying capability. Therefore, the combined refractive surface obtained by combining the toric surface and the progressive refractive surface as expressed by the combining formula (1) or (2) is superior for remedying astigmia.

Besides, the inner-surface progressive multifocal lens 1b in which the refractive surface 2 on the eyeball side is constructed as the combined refractive surface 14+15 obtained by combining the toric surface and the progressive refractive surface as expressed by the combining formula (1) or (2) can reduce the difference between the magnifying powers in the far-use portion and the near-use portion, and can sharply relieve the shaking and distortion of an image attributed to the difference.

Incidentally, when a progressive refractive surface having an astigmia remedying characteristic is constructed in such a way that the value of the z-coordinate to construct the original progressive refractive surface having the eyesight correcting characteristic is added to the value of the z-coordinate for constructing the original toric surface having the astigmia remedying characteristic, it is difficult to attain an eyesight correcting capability and an astigmia remedying capability which are quite equivalent to those of the astigmia-remedying progressive multifocal lens in the conventional art.

Also, the progressive multifocal lens whose progressive refractive surface is located on the object-side refractive surface or the eyeball-side refractive surface can be thinned by adding a prism whose base is in the direction of 270 degrees.

After the coordinate values of that combined refractive surface of the progressive multifocal lens in which the progressive refractive surface and the toric surface are integrated have been calculated in this manner, the combined refractive surface is created. The surface of such a molded lens, which is the opposite surface of either the object-side refractive surface or the eyeball-side refractive surface formed into a spherical surface or a rotationally-symmetric non-spherical surface, is fabricated by cutting, grinding, mirror-finished polishing, etc. by employing a numerical-control grinder on the basis of the coordinate values.

EXAMPLES

Example 1

The progressive multifocal lens of this example has its object side formed into a spherical surface, the base curve of which is constant at 4.00 D. An original progressive refractive surface before forming a toric surface is located on an eyeball side, and the average surfacial refractive power of a far-use portion is set at 4.00 D. The average surfacial refractive power of a near-use portion is set at 2.00 D, and the additional power is 2.00 D. A cylinder axis of an original surface is 90 degree, a spherical refractive power S is −2.00 D and a cylindrical refractive power C is −2.00 D. A combined refractive surface has been calculated from the original progressive refractive surface and the original toric surface by using the combining formula (1) or (2). Besides, the thickness t of the lens at the center thereof is 3.0 mm, and the diameter d of the lens is 70.0 mm.

Figure 3:
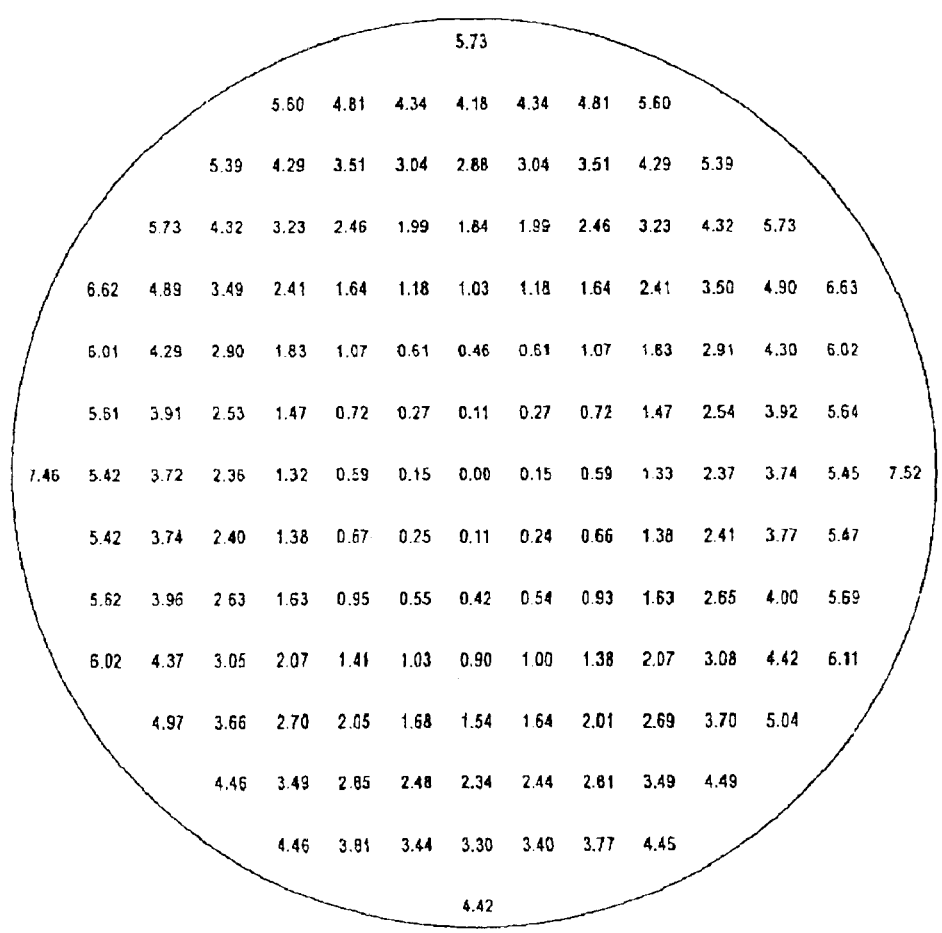
FIG. 3 is a coordinate profile diagram showing the z-coordinate values of the eyeball side of a progressive multifocal lens in Example 1.
Figure 4A:
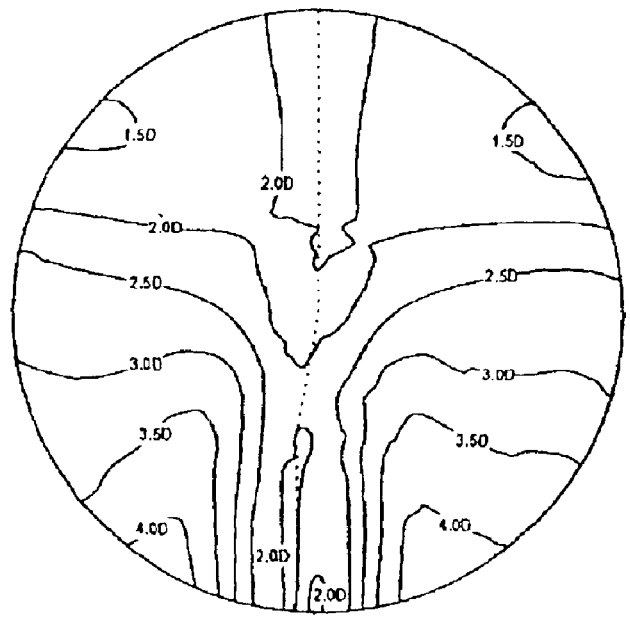
FIG. 4(a) is an astigmatism diagram of a multifocal lens in which a progressive surface and a toric surface are respectively located on an object side and an eyeball side, and (b) is an astigmatism diagram of the progressive multifocal lens in Example 1 in which a progressive surface and a toric surface are combined on the eyeball side.
Figure 4B:
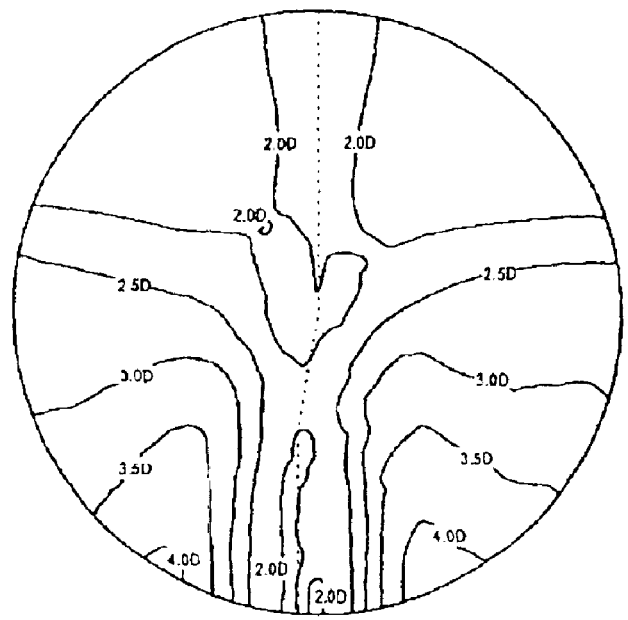

Shown in FIG. 3 are the z-coordinate values of the eyeball side of the progressive multifocal lens of Example 1. Besides, shown in FIG. 4(a) is the astigmatic profile of a conventional outer-surface progressive multifocal lens in which a progressive surface is located on an outer surface side, while a toric surface is located on an inner surface side. Besides, shown in FIG. 4(b) is the astigmatic profile of a progressive multifocal lens in which a combined refractive surface obtained by combining the same progressive surface and toric surface in accordance with the combining formula (1) or (2) is located on an inner surface side.

It is noticed from FIG. 4 that the progressive multifocal lens of Example 1 has, on its inner surface, the combined refractive surface in which the progressive refractive surface and the toric surface expressed by the toroidal surface are combined using the combining formula (1) or (2) is equivalent in performance to the outer-surface progressive multifocal lens in which the progressive surface is located on the object side, while the toric surface is located on the eyeball side.

Example 2

The progressive multifocal lens of this example has its object side formed into a spherical surface, the base curve of which is constant at 4.00 D. An original progressive refractive surface before forming a toric surface is located on an eyeball side, and the average surfacial refractive power of a far-use portion is set at 4.00 D, the average surfacial refractive power of a near-use portion is 2.00 D, and the additional power is 2.00 D. A cylinder axis of an original toric surface is 45 degree, a spherical refractive power S is 0.00 D and a cylindrical refractive power C is −6.00 D. A combined refractive surface has been calculated from the original progressive refractive surface and the original toric surface by using the combining formula (1) or (2). Besides, the thickness t of the lens at the center thereof is 3.0 mm, and the diameter d of the lens is 70.0 mm.

Figure 5:
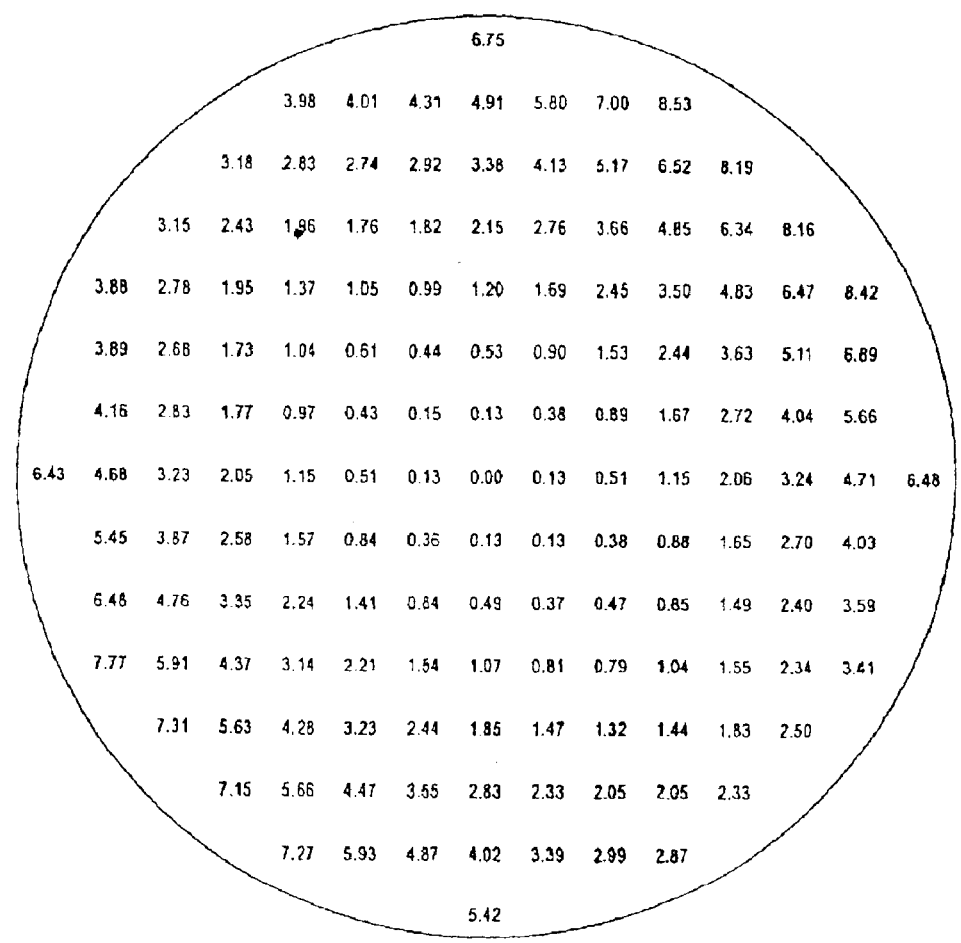
FIG. 5 is a coordinate profile diagram showing the z-coordinate values of the eyeball side of a progressive multifocal lens in Example 2.
Figure 6A:
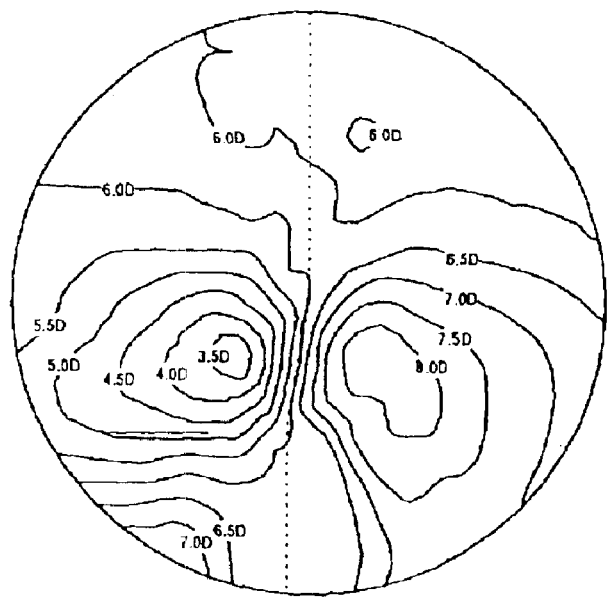
FIG. 6(a) is an astigmatism diagram of a multifocal lens in which a progressive surface and a toric surface are respectively located on an object side and an eyeball side, and (b) is an astigmatism diagram of the progressive multifocal lens in Example 2 in which a progressive surface and a toric surface are combined on the eyeball side.
Figure 6B:
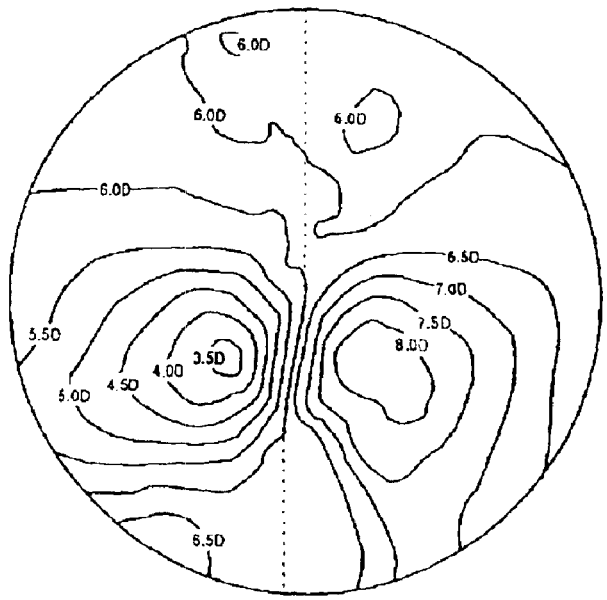

Shown in FIG. 5 are the z-coordinate values of the eyeball side of the progressive multifocal lens of Example 2. Besides, shown in FIG. 6(a) is the astigmatic profile of a conventional outer-surface progressive multifocal lens in which a progressive surface is located on an object side, while a toric surface is located on an eyeball side. Besides, shown in FIG. 6(b) is the astigmatic profile of a progressive multifocal lens in which a combined refractive surface obtained by combining the same progressive surface and toric surface in accordance with the combining formula (1) or (2) is located on an eyeball side.

It is noticed from FIG. 6 that the progressive multifocal lens of Example 2 has, on its eyeball side, the combined refractive surface in which the progressive refractive surface and the toric surface expressed by the toroidal surface are combined using the combining formula (1) or (2) is equivalent in performance to the outer-surface progressive multifocal lens in which the progressive surface is located on the object side, while the toric surface is located on the eyeball side.

Advantages

The disclosed progressive multifocal lens has a combined refractive surface in which a progressive refractive surface and a toric surface expressed by a toroidal surface are combined, and a refractive surface on either of an object side and an eyeball side can be endowed with an eyesight correcting capability and an astigmia remedying capability.

Besides, the method of the present invention for designing a progressive multifocal lens can design the progressive multifocal lens in which a combined refractive surface obtained by combining a progressive refractive surface and a toric surface can be on either of an object side and an eyeball side.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A progressive multifocal lens for correcting an eyesight, said lens having a progressive refractive surface on an eyeball side, said progressive refractive surface comprising:
   a far-use portion,
   a near-use portion having a refractive power different from the far-use portion, and
   a progressive portion whose refractive power changes progressively between the far-use and near-use portions,
   wherein the progressive refractive surface is a combination of an original progressive refractive surface for remedying only eyesight and an original toric surface for remedying only astigmia based on a following formula:

$$z_p = \frac{2\left(\frac{(c_p+c_y)y_p^2}{1+\sqrt{1-(c_p+c_y)^2 y_p^2}}\right) - (c_p+c_x)\left(\frac{(c_p+c_y)y_p^2}{1+\sqrt{1-(c_p+c_y)^2 y_p^2}}\right)^2 + (c_p+c_x)x_p^2}{1+\sqrt{\left(1-\frac{(c_p+c_x)(c_p+c_y)y_p^2}{1+\sqrt{1-(c_p+c_y)^2 y_p^2}}\right)^2 - (c_p+c_x)^2 x_p^2}}$$

where z-axis is an axis which passes through a center of the progressive refractive surface from an object side onto the eyeball side, x-axis is in a direction of an cylinder axis of the original toric surface, and y-axis is an axis which is orthogonal to the z-axis and the x-axis, $z_p$ is any point $P(x_p, y_p, z_p)$ of the combined refractive surface, $C_p$ is an approximate curvature of the original progressive refractive surface, $C_x$ is a curvature in the direction of the cylinder axis of said original toric surface, and $C_y$ is a curvature in a direction orthogonal to said cylinder axis.

2. A progressive multifocal lens for correcting an eyesight, said lens having a progressive refractive surface on an object side, said progressive refractive surface comprising:

a far-use portion, a near-use portion having a refractive power different from the far-use portion, and a progressive portion whose refractive power changes progressively between the far-use and near-use portions, wherein the progressive refractive surface is a combination of an original progressive refractive surface for remedying only eyesight and an original toric surface for remedying only astigmia based on a following formula:

$$z_p = \frac{2\left(\frac{(c_p+c_y)y_p^2}{1+\sqrt{1-(c_p+c_y)^2 y_p^2}}\right) - (c_p+c_x)\left(\frac{(c_p+c_y)y_p^2}{1+\sqrt{1-(c_p+c_y)^2 y_p^2}}\right)^2 + (c_p+c_x)x_p^2}{1+\sqrt{\left(1-\frac{(c_p+c_x)(c_p+c_y)y_p^2}{1+\sqrt{1-(c_p+c_y)^2 y_p^2}}\right)^2 - (c_p+c_x)^2 x_p^2}}$$

where z-axis is an axis which passes through a center of the progressive refractive surface from the object side onto an eyeball side, x-axis is in a direction of an cylinder axis of the original toric surface, y-axis is an axis which is orthogonal to the z-axis and the x-axis, $z_p$ is any point $P(x_p, y_p, z_p)$ of the combined refractive surface, $C_p$ is an approximate curvature of the original progressive refractive surface, $C_x$ is a curvature in the direction of the cylinder axis of said original toric surface, and $C_y$ is a curvature in a direction orthogonal to said cylinder axis.

3. A progressive multifocal lens for correcting an eyesight, said lens having a progressive refractive surface on an eyeball side, said progressive refractive surface comprising:

a far-use portion, a near-use portion having a refractive power different from the far-use portion, and a progressive portion whose refractive power changes progressively between the far-use and near-use portions, wherein the progressive refractive surface is a combination of an original progressive refractive surface for remedying only eyesight and an original toric surface for remedying only astigmia based on a following formula:

$$z_p = \frac{2\left(\frac{(c_p+c_x)x_p^2}{1+\sqrt{1-(c_p+c_x)^2 x_p^2}}\right) - (c_p+c_y)\left(\frac{(c_p+c_x)x_p^2}{1+\sqrt{1-(c_p+c_x)^2 x_p^2}}\right)^2 + (c_p+c_y)y_p^2}{1+\sqrt{\left(1-\frac{(c_p+c_x)(c_p+c_y)x_p^2}{1+\sqrt{1-(c_p+c_x)^2 x_p^2}}\right)^2 - (c_p+c_y)^2 y_p^2}}$$

where z-axis is an axis which passes through a center of the progressive refractive surface from an object side onto the eyeball side, x-axis is in a direction of an cylinder axis of the original toric surface, and y-axis is an axis which is orthogonal to the z-axis and the x-axis, $z_p$ is any point $P(x_p, y_p, z_p)$ of the combined refractive surface, $C_p$ is an approximate curvature of the original progressive refractive surface, $C_x$ is a curvature in the direction of the cylinder axis of said original toric surface, and $C_y$ is a curvature in a direction orthogonal to said cylinder axis.

4. A progressive multifocal lens for correcting an eyesight, said lens having a progressive refractive surface on an object side, said progressive refractive surface comprising:

a far-use portion, a near-use portion having a refractive power different from the far-use portion, and a progressive portion whose refractive power changes progressively between the far-use and near-use portions, wherein the progressive refractive surface is a combination of an original progressive refractive surface for remedying only eyesight and an original toric surface for remedying only astigmia based on a following formula:

$$z_p = \frac{2\left(\frac{(c_p+c_x)x_p^2}{1+\sqrt{1-(c_p+c_x)^2 x_p^2}}\right) - (c_p+c_y)\left(\frac{(c_p+c_x)x_p^2}{1+\sqrt{1-(c_p+c_x)^2 x_p^2}}\right)^2 + (c_p+c_y)y_p^2}{1+\sqrt{\left(1-\frac{(c_p+c_x)(c_p+c_y)x_p^2}{1+\sqrt{1-(c_p+c_x)^2 x_p^2}}\right)^2 - (c_p+c_y)^2 y_p^2}}$$

where z-axis is an axis which passes through a center of the progressive refractive surface from the object side onto an eyeball side, x-axis is in a direction of an cylinder axis of the original toric surface, y-axis is an axis which is orthogonal to the z-axis and the x-axis, $z_p$ is any point $P(x_p, y_p, z_p)$ of the combined refractive surface, $C_p$ is an approximate curvature of the original progressive refractive surface, $C_x$ is a curvature in the direction of the cylinder axis of said original toric surface, and $C_y$ is a curvature in a direction orthogonal to said cylinder axis.

5. The progressive multifocal lens as defined in claim 1 wherein the refractive surface on the object side is a spherical surface or a rotationally-symmetric non-spherical surface.

6. The progressive multifocal lens as defined in claim 2 wherein the refractive surface on the eyeball side is a spherical surface or a rotationally-symmetric non-spherical surface.

7. The progressive multifocal lens as defined in claim 3 wherein the refractive surface on the object side is a spherical surface or a rotationally-symmetric non-spherical surface.

8. The progressive multifocal lens as defined in claim 4 wherein the refractive surface on the eyeball side is a spherical surface or a rotationally-symmetric non-spherical surface.

9. The progressive multifocal lens as defined in claim 1 wherein the refractive surface on the object side is a spherical surface or a rotationally-symmetric non-spherical surface.

10. The progressive multifocal lens as defined in claim 2 wherein the refractive surface on the eyeball side is a spherical surface or a rotationally-symmetric non-spherical surface.

11. The progressive multifocal lens as defined in claim 3 wherein the refractive surface on the object side is a spherical surface or a rotationally-symmetric non-spherical surface.

12. The progressive multifocal lens as defined in claim 4 wherein the refractive surface on the eyeball side is a spherical surface or a rotationally-symmetric non-spherical surface.

13. A method of designing a multifocal lens for correcting an eyesight, said lens having a progressive refractive surface on an eyeball side, said progressive refractive surface comprising a far-use portion, a near-use portion having a refractive power different from the far-use portion, and a progressive portion whose refractive power changes progressively between the far-use and near-use portions, the method comprising:

a) calculating an original progressive refractive surface for remedying only eyesight;
   b) calculating an original toric surface for remedying only astigmia based;
   c) calculating a combined refractive surface using a following formula:

$$z_p = \frac{2\left(\frac{(c_p+c_y)y_p^2}{1+\sqrt{1-(c_p+c_y)^2 y_p^2}}\right) - (c_p+c_x)\left(\frac{(c_p+c_y)y_p^2}{1+\sqrt{1-(c_p+c_y)^2 y_p^2}}\right)^2 + (c_p+c_x)x_p^2}{1+\sqrt{\left(1-\frac{(c_p+c_x)(c_p+c_y)y_p^2}{1+\sqrt{1-(c_p+c_y)^2 y_p^2}}\right)^2 - (c_p+c_x)^2 x_p^2}}$$

where z-axis is an axis which passes through a center of the progressive refractive surface from an object side onto the eyeball side, x-axis is in a direction of an cylinder axis of the original toric surface, and y-axis is an axis which is orthogonal to the z-axis and the x-axis, $z_p$ is any point $P(x_p, y_p, z_p)$ of the combined refractive surface, $C_p$ is an approximate curvature of the original progressive refractive surface, $C_x$ is a curvature in the direction of the cylinder axis of said original toric surface, and $C_y$ is a curvature in a direction orthogonal to said cylinder axis.

14. A method of designing a multifocal lens for correcting an eyesight, said lens having a progressive refractive surface on an object side, said progressive refractive surface comprising a far-use portion, a near-use portion having a refractive power different from the far-use portion, and a progressive portion whose refractive power changes progressively between the far-use and near-use portions, the method comprising:

a) calculating an original progressive refractive surface for remedying only eyesight;
   b) calculating an original toric surface for remedying only astigmia based;
   c) calculating a combined refractive surface using a following formula:

$$z_p = \frac{2\left(\frac{(c_p+c_y)y_p^2}{1+\sqrt{1-(c_p+c_y)^2 y_p^2}}\right) - (c_p+c_x)\left(\frac{(c_p+c_y)y_p^2}{1+\sqrt{1-(c_p+c_y)^2 y_p^2}}\right)^2 + (c_p+c_x)x_p^2}{1+\sqrt{\left(1-\frac{(c_p+c_x)(c_p+c_y)y_p^2}{1+\sqrt{1-(c_p+c_y)^2 y_p^2}}\right)^2 - (c_p+c_x)^2 x_p^2}}$$

where z-axis is an axis which passes through a center of the progressive refractive surface from an object side onto the eyeball side, x-axis is in a direction of an cylinder axis of the original toric surface, and y-axis is an axis which is orthogonal to the z-axis and the x-axis, $z_p$ is any point $P(x_p, y_p, z_p)$ of the combined refractive surface, $C_p$ is an approximate curvature of the original progressive refractive surface, $C_x$ is a curvature in the direction of the cylinder axis of said original toric surface, and $C_y$ is a curvature in a direction orthogonal to said cylinder axis.

15. A method of designing a multifocal lens for correcting an eyesight, said lens having a progressive refractive surface on an eyeball side, said progressive refractive surface comprising a far-use portion, a near-use portion having a refractive power different from the far-use portion, and a progressive portion whose refractive power changes progressively between the far-use and near-use portions, the method comprising:

a) calculating an original progressive refractive surface for remedying only eyesight;
   b) calculating an original toric surface for remedying only astigmia based;
   c) calculating a combined refractive surface using a following formula:

$$z_p = \frac{(c_p+c_y)\left(\dfrac{(c_p+c_x)x_p^2}{1+\sqrt{1-(c_p+c_x)^2 x_p^2}}\right)^2 + (c_p+c_y)y_p^2 - 2\left(\dfrac{(c_p+c_x)x_p^2}{1+\sqrt{1-(c_p+c_x)^2 x_p^2}}\right)}{1+\sqrt{\left(1-\dfrac{(c_p+c_x)(c_p+c_y)x_p^2}{1+\sqrt{1-(c_p+c_x)^2 x_p^2}}\right)^2 - (c_p+c_y)^2 y_p^2}}$$

where z-axis is an axis which passes through a center of the progressive refractive surface from an object side onto the eyeball side, x-axis is in a direction of an cylinder axis of the original toric surface, and y-axis is an axis which is orthogonal to the z-axis and the x-axis, $z_p$ is any point $P(x_p, y_p, z_p)$ of the combined refractive surface, $C_p$ is an approximate curvature of the original progressive refractive surface, $C_x$ is a curvature in the direction of the cylinder axis of said original toric surface, and $C_y$ is a curvature in a direction orthogonal to said cylinder axis.

16. A method of designing a multifocal lens for correcting an eyesight, said lens having a progressive refractive surface on an object side, said progressive refractive surface comprising a far-use portion, a near-use portion having a refractive power different from the far-use portion, and a progressive portion whose refractive power changes progressively between the far-use and near-use portions, the method comprising:

a) calculating an original progressive refractive surface for remedying only eyesight;

b) calculating an original toric surface for remedying only astigmia based;

c) calculating a combined refractive surface using a following formula:

$$z_p = \frac{(c_p+c_y)\left(\dfrac{(c_p+c_x)x_p^2}{1+\sqrt{1-(c_p+c_x)^2 x_p^2}}\right)^2 + (c_p+c_y)y_p^2 - 2\left(\dfrac{(c_p+c_x)x_p^2}{1+\sqrt{1-(c_p+c_x)^2 x_p^2}}\right)}{1+\sqrt{\left(1-\dfrac{(c_p+c_x)(c_p+c_y)x_p^2}{1+\sqrt{1-(c_p+c_x)^2 x_p^2}}\right)^2 - (c_p+c_y)^2 y_p^2}}$$

where z-axis is an axis which passes through a center of the progressive refractive surface from an object side onto the eyeball side, x-axis is in a direction of an cylinder axis of the original toric surface, and y-axis is an axis which is orthogonal to the z-axis and the x-axis, $z_p$ is any point $P(x_p, y_p, z_p)$ of the combined refractive surface, $C_p$ is an approximate curvature of the original progressive refractive surface, $C_x$ is a curvature in the direction of the cylinder axis of said original toric surface, and $C_y$ is a curvature in a direction orthogonal to said cylinder axis.

17. The progressive multifocal lens as defined in claim 13 wherein the refractive surface on the object side is a spherical surface or a rotationally-symmetric non-spherical surface.

18. The progressive multifocal lens as defined in claim 14 wherein the refractive surface on the eyeball side is a spherical surface or a rotationally-symmetric non-spherical surface.

19. The progressive multifocal lens as defined in claim 15 wherein the refractive surface on the object side is a spherical surface or a rotationally-symmetric non-spherical surface.

20. The progressive multifocal lens as defined in claim 16 wherein the refractive surface on the eyeball side is a spherical surface or a rotationally-symmetric non-spherical surface.

21. The progressive multifocal lens as defined in claim 13 wherein the refractive surface on the object side is a spherical surface or a rotationally-symmetric non-spherical surface.

22. The progressive multifocal lens as defined in claim 14 wherein the refractive surface on the eyeball side is a spherical surface or a rotationally-symmetric non-spherical surface.

23. The progressive multifocal lens as defined in claim 15 wherein the refractive surface on the object side is a spherical surface or a rotationally-symmetric non-spherical surface.

24. The progressive multifocal lens as defined in claim 16 wherein the refractive surface on the eyeball side is a spherical surface or a rotationally-symmetric non-spherical surface.

* * * * *